United States Patent [19]

Burkhardt et al.

[11] Patent Number: 4,503,493
[45] Date of Patent: Mar. 5, 1985

[54] NC MACHINE FOR PRODUCING TANGENTIAL ENTRY TO AND EXIT FROM A COMPENSATED CONTOUR

[75] Inventors: Horst Burkhardt, Truchlaching; Josef Huber, Engelsberg; Norbert Vollmayr, Traunwalchen, all of Fed. Rep. of Germany

[73] Assignee: Dr. Johannes Heidenhain GmbH, Traunreut, Fed. Rep. of Germany

[21] Appl. No.: 363,474

[22] Filed: Mar. 30, 1982

[30] Foreign Application Priority Data

Apr. 7, 1981 [DE] Fed. Rep. of Germany ....... 3113970

[51] Int. Cl.³ .................. G05B 13/04; G05B 19/24
[52] U.S. Cl. ............................ 364/170; 364/169; 364/474; 364/513; 364/571; 318/572; 318/573; 408/12; 408/13
[58] Field of Search ............... 364/474, 475, 513, 571, 364/167, 168, 169, 170; 318/572, 573, 574, 570; 408/8, 9, 10, 11, 12, 13; 82/2 B

[56] References Cited

U.S. PATENT DOCUMENTS

| | | | |
|---|---|---|---|
| 3,679,955 | 7/1972 | Rhoades | 318/572 |
| 3,766,369 | 10/1973 | Watanabe et al. | 318/570 |
| 3,809,868 | 5/1974 | Villalobos et al. | 364/168 |
| 3,866,179 | 2/1975 | McGee et al. | 364/170 |
| 3,911,346 | 11/1975 | Schneekloth | 318/572 |
| 3,969,615 | 7/1976 | Bowers et al. | 318/574 |
| 3,970,830 | 7/1976 | White et al. | 364/168 |
| 4,031,369 | 6/1977 | Heaman et al. | 318/573 |
| 4,035,706 | 7/1977 | Cutler | 318/572 |
| 4,070,608 | 1/1978 | Rosshirt et al. | 318/572 |
| 4,079,235 | 3/1978 | Froyd et al. | 364/169 |
| 4,109,187 | 8/1978 | Steinberg et al. | 318/572 |
| 4,135,238 | 1/1979 | Hamill et al. | 364/472 |
| 4,243,924 | 1/1981 | Onoda et al. | 318/573 |
| 4,409,650 | 10/1983 | Noguchi | 364/169 |

FOREIGN PATENT DOCUMENTS 0305738 8/1980 Fed. Rep. of Germany .

Primary Examiner—Jerry Smith
Assistant Examiner—John R. Lastova
Attorney, Agent, or Firm—Willian Brinks Olds Hofer Gilson & Lione Ltd.

[57] ABSTRACT

A numerically controlled machine tool for producing tangential entry into a compensated contour and for the tangential leaving from a compensated contour. The numerically controlled machine tool also produces the interior or exterior rounding of intersections between two contours.

9 Claims, 16 Drawing Figures

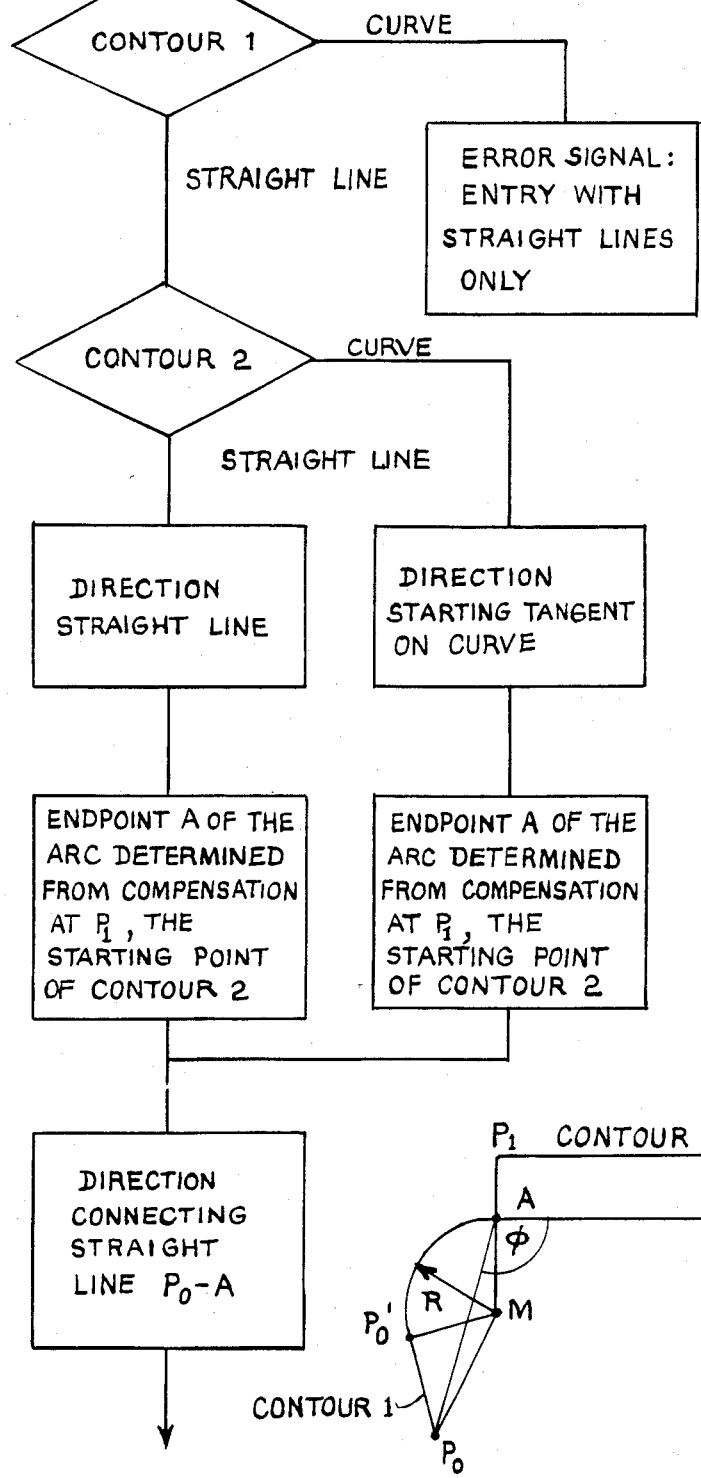
FIG.4a₁

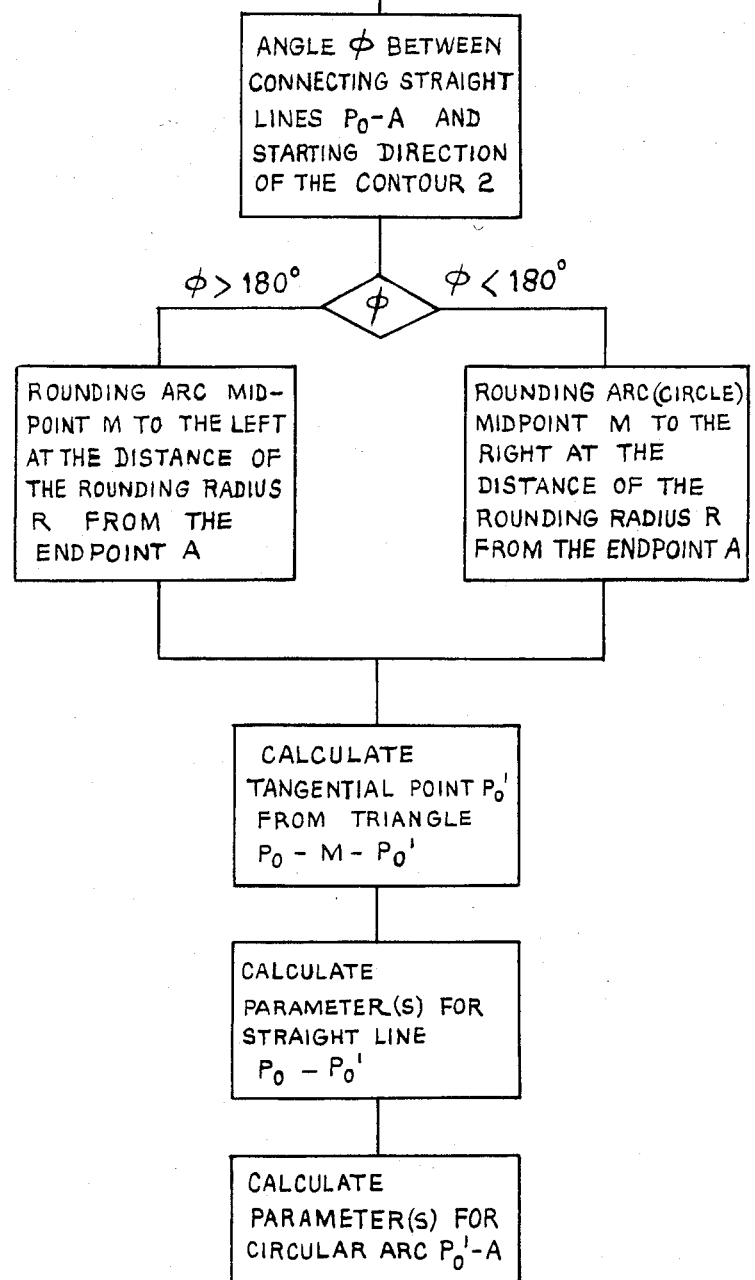
FIG. 4a₂
CONTINUATION OF THE CALCULATION OF THE COMPENSATED CONTOUR 2

FIG.4b($1_1$)

```
( STRAIGHT LINE - ROUNDING - STRAIGHT LINE )
              │
              ▼
    ┌──────────────────┐
    │  DIRECTION AND   │
    │  LENGTH P₁-P₂    │
    │  OF THE CONTOUR 1│
    └──────────────────┘
              │
              ▼
    ┌──────────────────┐
    │  DIRECTION AND   │
    │  LENGTH P₂-P₃    │
    │  OF THE CONTOUR 2│
    └──────────────────┘
              │
              ▼
    ┌──────────────────┐
    │  ANGLE φ BETWEEN │
    │  CONTOUR 1 AND   │
    │  CONTOUR 2       │
    └──────────────────┘
              │
              ▼
    ┌──────────────────┐
    │  ANGLE φ/2       │
    └──────────────────┘
              │
              ▼
    ┌──────────────────┐
    │  DIRECTION OF THE│
    │  ANGLE BISECTOR  │
    │  OF THE          │
    │  CONTOURS 1 AND 2│
    └──────────────────┘
              │
              ▼
    ┌──────────────────┐
    │  CALCULATE       │
    │  ROUNDING CIRCLE │
    │  MIDPOINT M      │
    └──────────────────┘
              │
              ▼
         ╱╲ MILLING ╲    YES
        ╱  TOOL RADIUS ╲─────────┐
        ╲ COMPENSATION ╱         │
         ╲╱                      ▼
          │ NO              ╱╲ COMPENSATION ╲  YES
          ▼                ╱   IN INSIDE    ╲───┐
    ┌──────────────┐       ╲     CORNER     ╱   │
    │CIRCLE RADIUS=│        ╲╱                  │
    │ROUNDING      │         │ NO               │
    │RADIUS        │         ▼                  ▼
    └──────────────┘  ┌──────────────┐  ┌──────────────┐
          │           │CIRCLE RADIUS=│  │CIRCLE RADIUS=│
          │           │ROUNDING      │  │ROUNDING      │
          │           │RADIUS +      │  │RADIUS -      │
          │           │MILLING TOOL  │  │MILLING TOOL  │
          │           │RADIUS        │  │RADIUS        │
          │           └──────────────┘  └──────────────┘
          │                  │                  │
          └──────────────────┴──────────────────┘
                             │
                             ▼
```

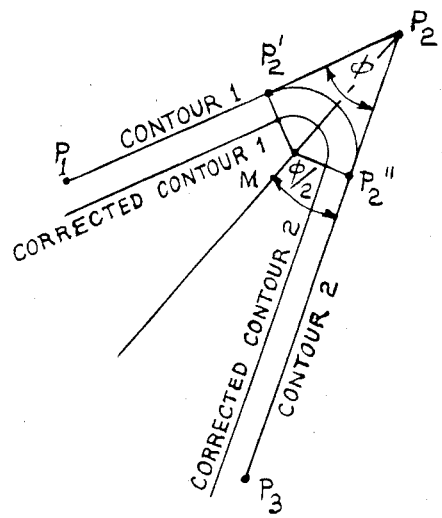

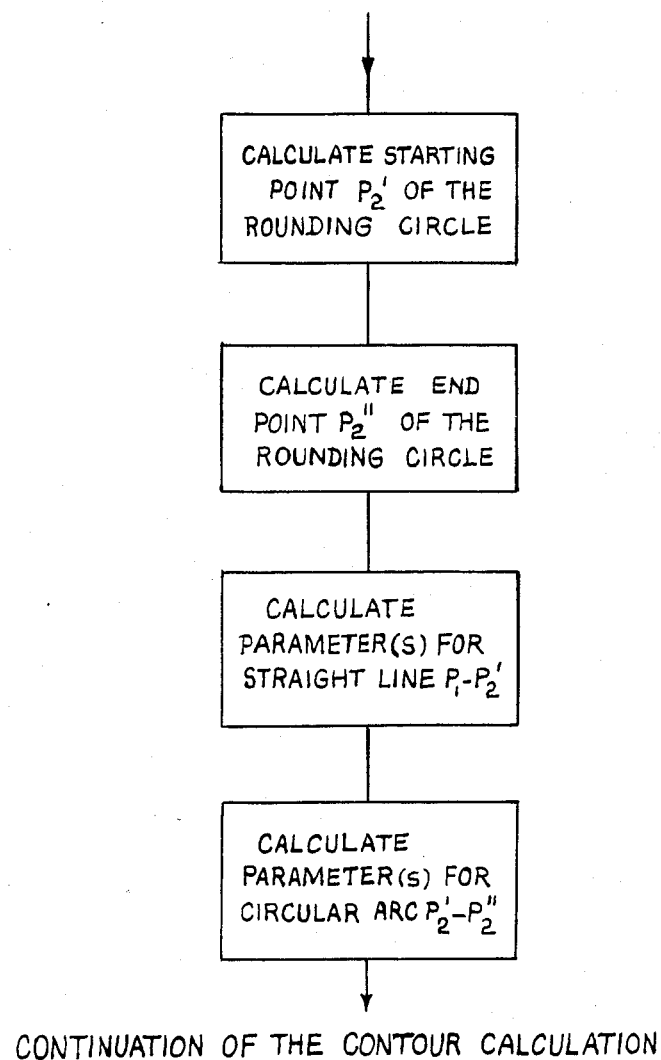
FIG.4b($1_2$)

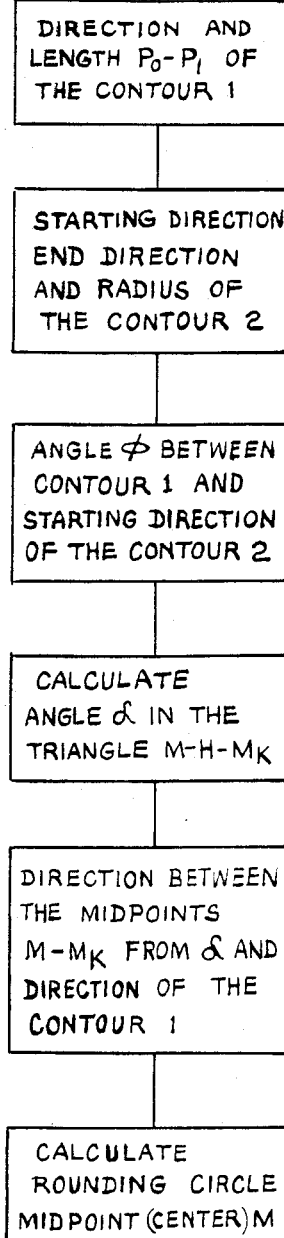
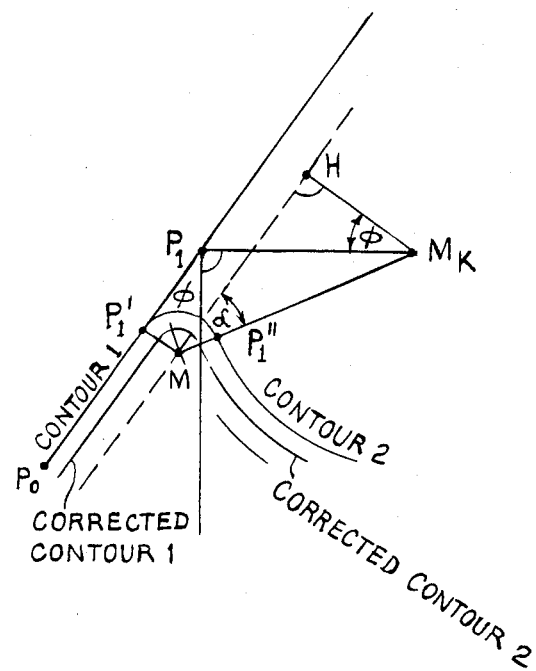
FIG.4b ($2_1$)

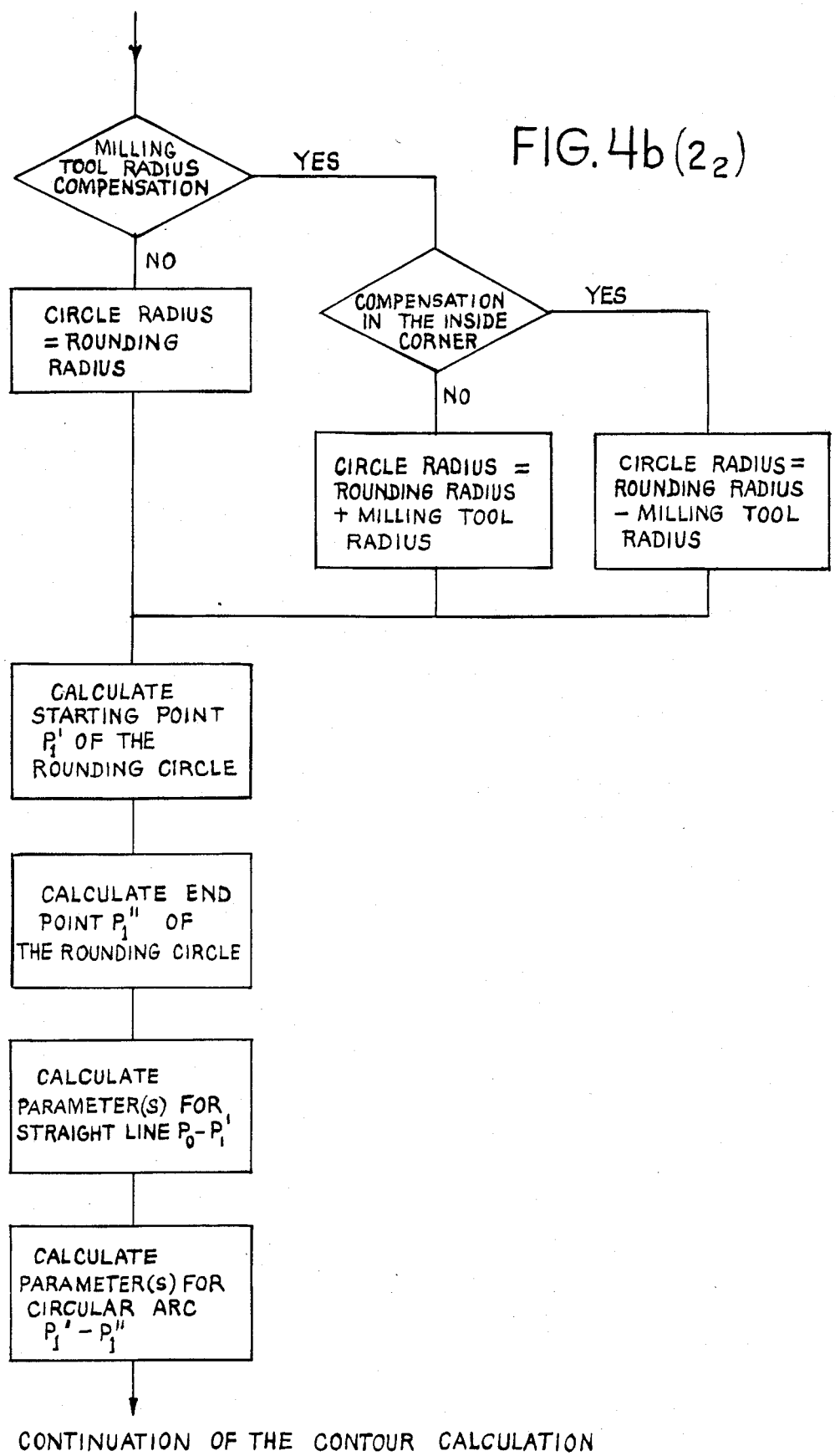
FIG. 4b($2_2$)
CONTINUATION OF THE CONTOUR CALCULATION

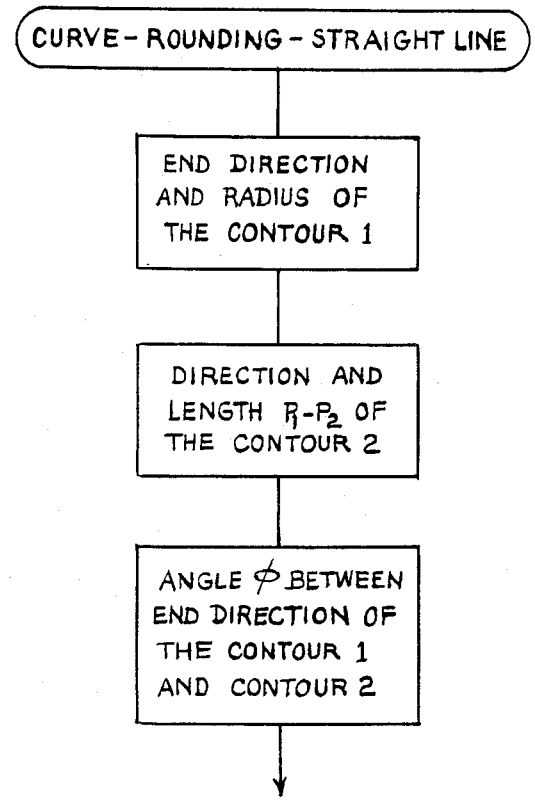
FIG. 4b(3)
LIKE STRAIGHT LINE - ROUNDING - CURVE (SEQUENCE OF THE
CONTOURS REVERSED)

FIG.4b ($4_1$)
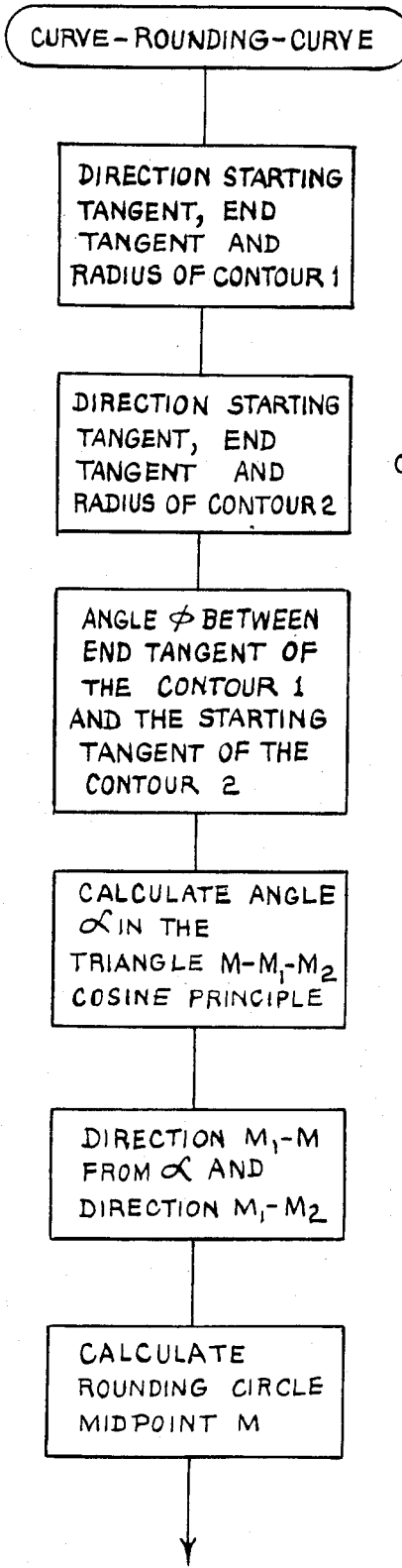
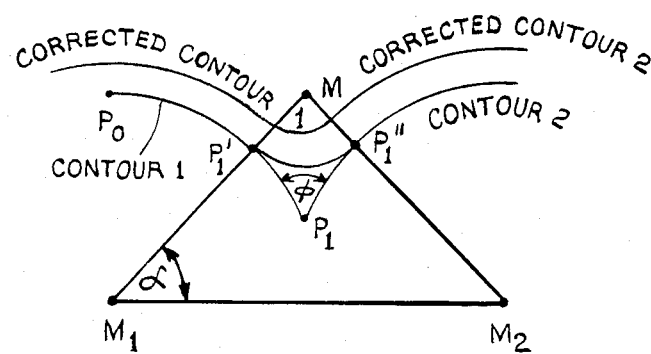

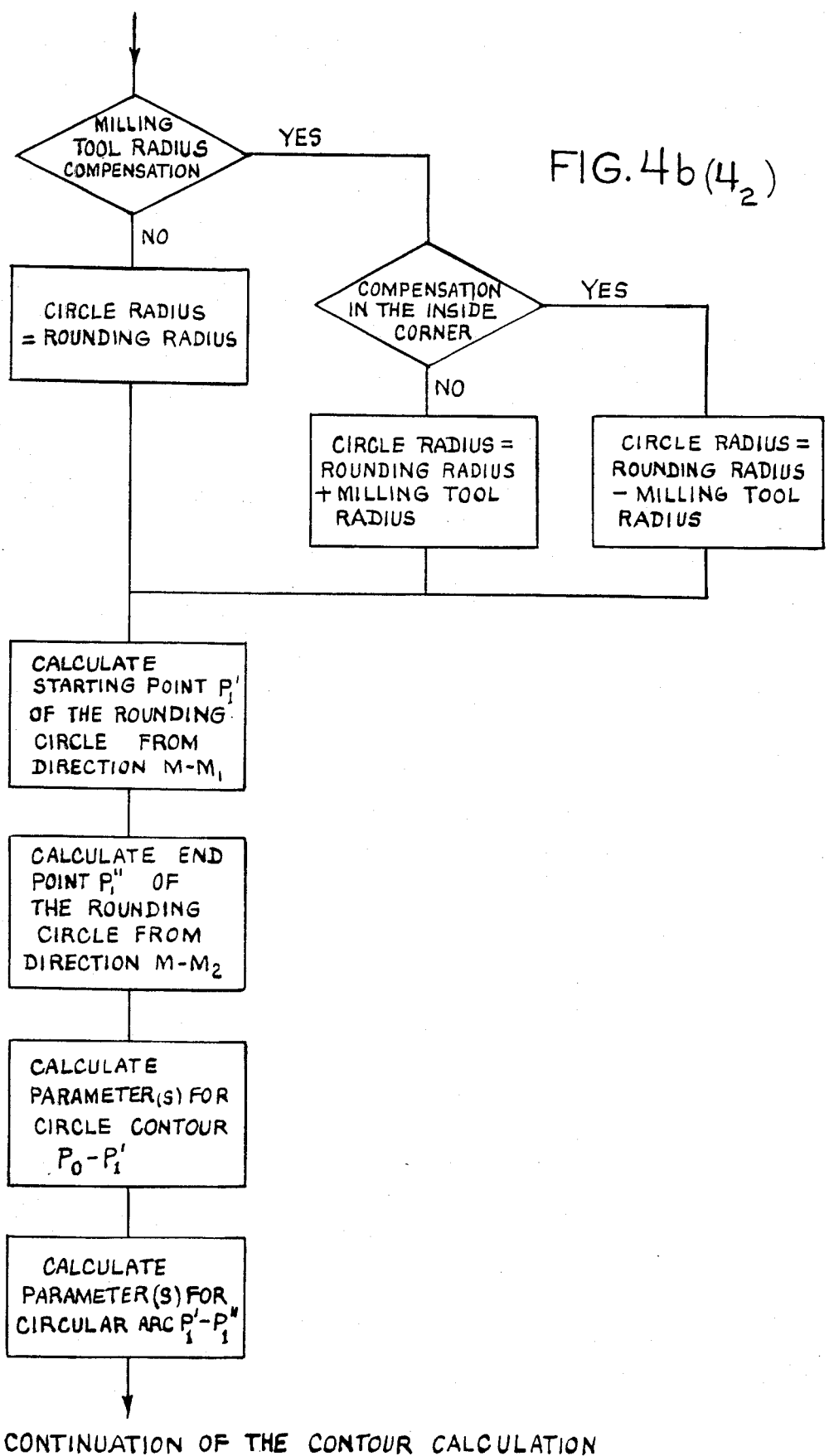
FIG. 4b (4₂)
CONTINUATION OF THE CONTOUR CALCULATION

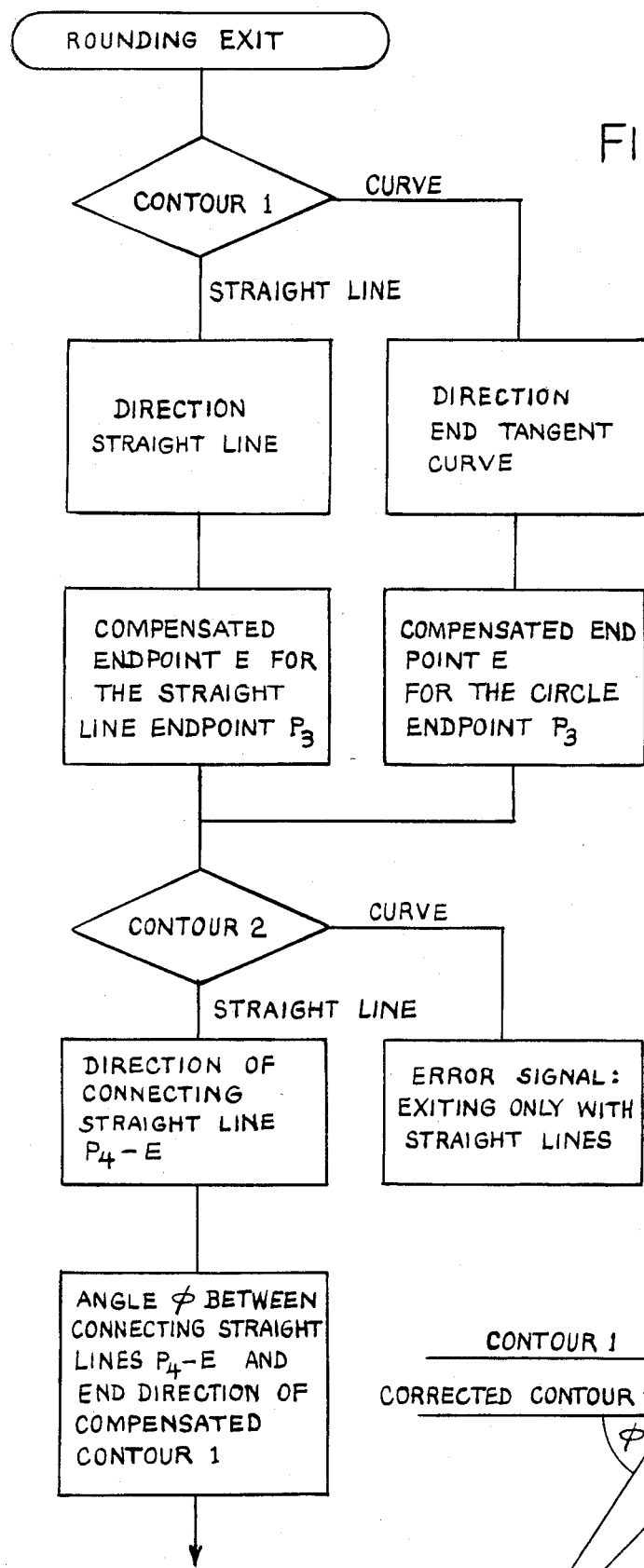
FIG.4c₁
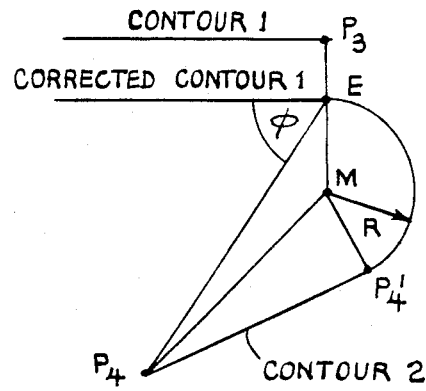

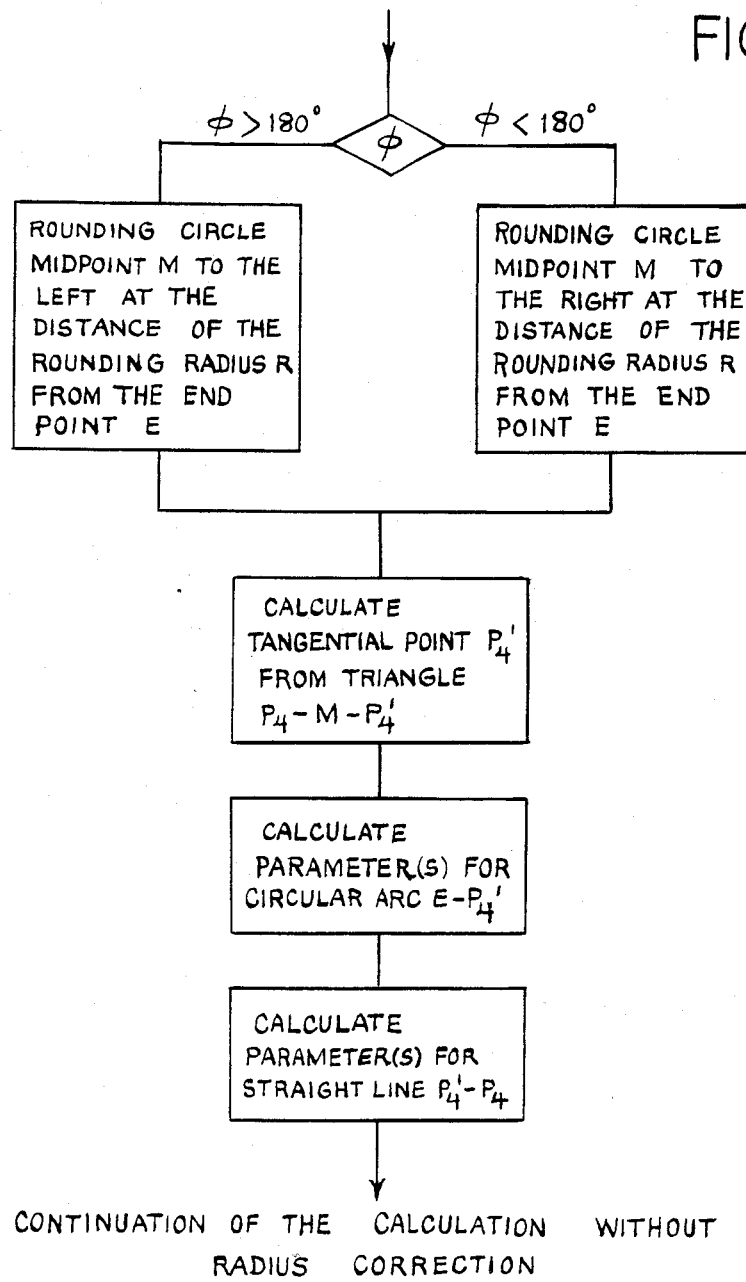

NC MACHINE FOR PRODUCING TANGENTIAL ENTRY TO AND EXIT FROM A COMPENSATED CONTOUR

BACKGROUND OF THE INVENTION

This invention relates to a numerically controlled machine tool which moves along a workpiece to create the desired contour.

A numerically controlled machine tool is programmed to receive information indicating the desired contour for the workpiece. German unexamined patent specification OS No. 30 05 738 discloses a machine tool capable of compensating for its tool radius. The tool follows a compensated contour separated from the desired contour by the distance of the radius of the tool so that the workpiece is machined to conform to the desired contour.

As the tool is initially brought into contact with the workpiece its direction must change to begin machining the desired contour. At this direction change the movement of the tool must be briefly stopped to avoid cutting too deeply into the workpiece. This delay adds to the processing time for machining the workpiece.

SUMMARY OF THE INVENTION

This invention is directed to a numerically controlled machine tool which takes input indicating desired rounding radii for arcs to be followed by the tool upon entry and exit from contact with the workpiece and determines the center of curvature of the arcs and the end points of the arcs so that the tool can enter and leave contact with the workpiece with constant path velocity. The machine tool can also determine from a rounding radius, an arcuate path to follow between two intersecting contours such that the tool may maintain a constant velocity throughout. A constant path velocity is maintained by entering and leaving the contour tangent to the contour. This results in a substantial shortening of the processing time. Conveniently only the rounding radius need be input to receive the advantages of the invention. The invention thus makes possible the rounding of edges with arbitrary rounding radii as well as tangential entry into a contour and exit from a contour.

Other objects and advantages of the invention will become apparent during the following description of the presently preferred embodiment of the invention taken in conjunction with the drawings.

FIGS. $4a_1$, and $4a_2$ are a flow diagram of the rounding entry subroutine;

FIGS. $4b$, $4b(1_1)$, $4b(1_2)$, $4b(2_1)$, $4b(2_2)$, $4b(3)$, $4b(4_1)$ and $4b(4_2)$ are a flow diagram of the rounding intersection subroutine with its subroutines for the four combinations of contour intersections; and FIGS. $4c_1$ and $5c_2$ are a flow diagram of the rounding exit subroutine.

DETAILED DESCRIPTION OF THE PREFERRED EMBODIMENTS

Figure 1:
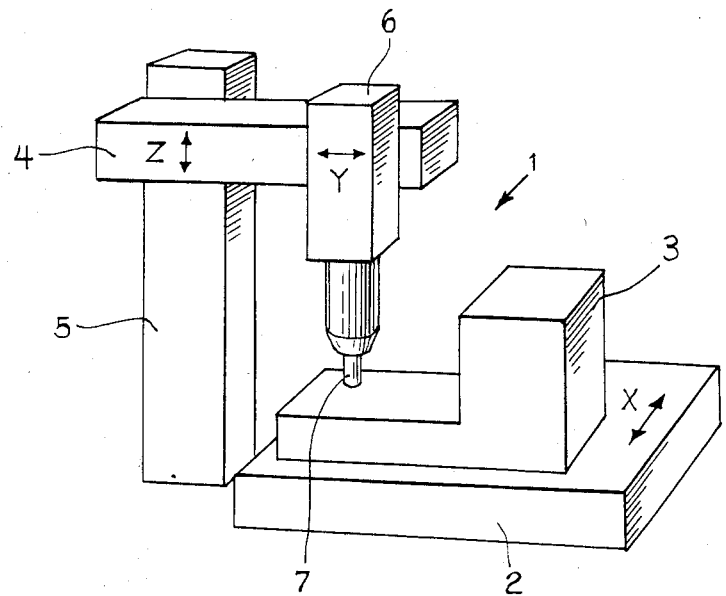
FIG. 1 is a schematic diagram of a three axis milling machine.

Referring now to FIG. 1, a three axis milling machine 1 is shown schematically. A workpiece 3 to be processed is positioned securely atop a slide piece 2 which is drivable in the X direction on a bed which is not shown. A milling tool 7 is carried by spindle head 6. Spindle head 6 may be moved in the Y direction along a cantilever 4. The cantilever 4 is drivable on an upright 5 vertically in the Z direction. The following description only considers movements of the workpiece 3 in the X direction and of the tool 7 in the Y direction.

Figure 2:
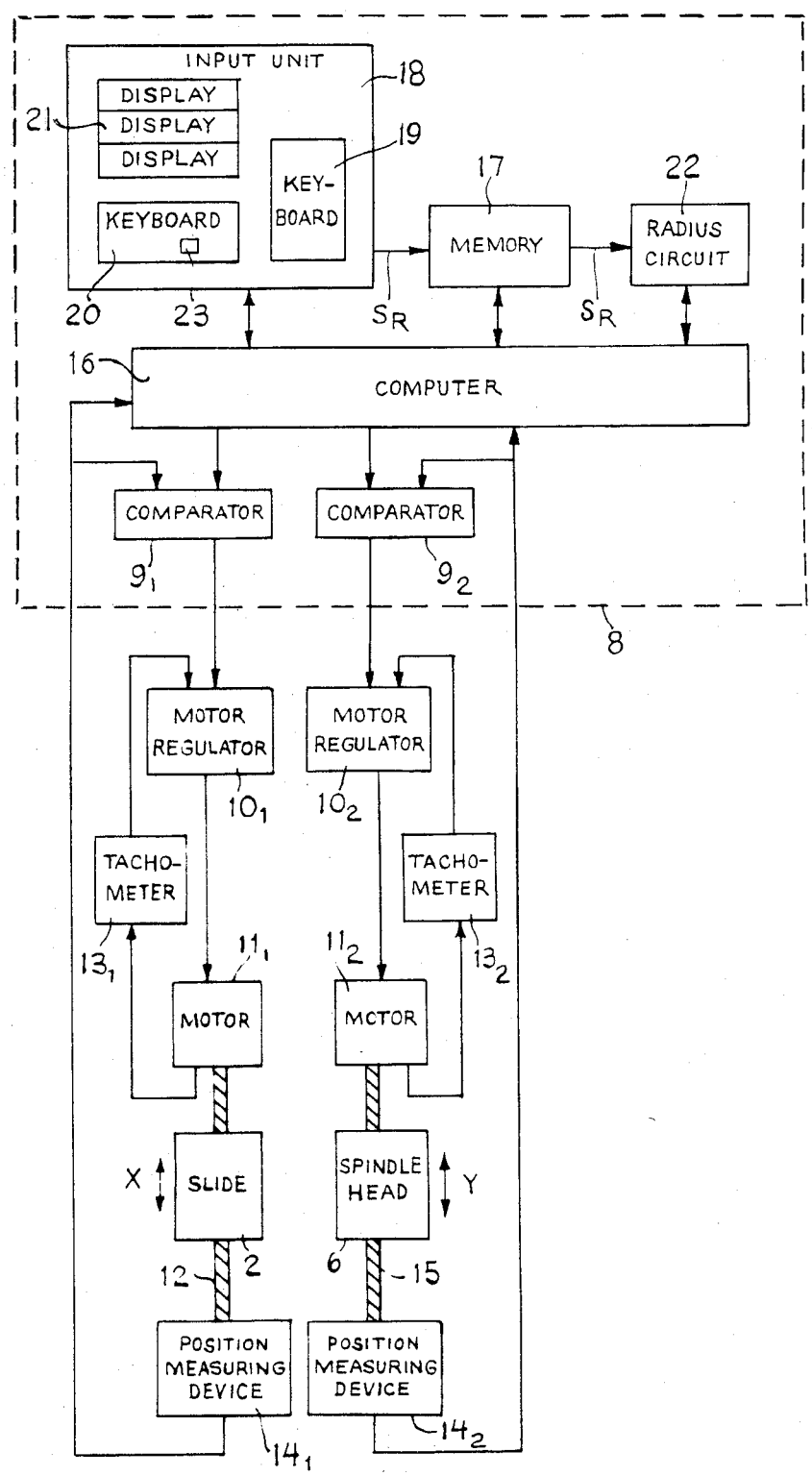
FIG. 2 is a block circuit diagram of a numerical path control for two dimension position regulation.

A numerical path control 8 is connected to the machine tool, as schematically shown in FIG. 2, for controlling the tool's positioning.

The control for the positioning in the X direction is a closed loop which includes a desired value/actual value comparator $9_1$ of the numerical path control 8. The comparator $9_1$ produces an analog output which is connected to the first input of a motor regulator $10_1$ to determine the feed speed. The output of the motor regulator $10_1$ acts upon a motor $11_1$. The motor by means of a spindle 12 brings about the movement of the slide piece 2 in the X direction. The motor $11_1$ is also coupled to a tachometer $13_1$ whose output is connected to the second input of the motor regulator $10_1$. A position measuring device $14_1$ is also coupled to the spindle 12 to produce output signals indicating the actual value of the positions of the workpiece 3 in the X axis. These output signals are supplied to the desired spindle head 6 is achieved by means of a spindle 15. The circuitry is the same as in the X direction control loop and the corresponding circuit blocks are indicated with the same reference symbols but with a subscript 2.

The numerical path control 8 includes the computer 16, a memory 17 and an input unit 18. The input unit 18 has a keyboard 20 for controlling the running of the program and a display field 21 for the display of the actual values of the position of the workpiece 2 and the tool 7 in the X, Y and Z directions. The actual value positions are fed from the position measuring devices 14 into the computer 16 and the input unit 18.

According to the invention, there is provided a radius circuit 22 in addition to the computer 16. A desired rounding radius is supplied on the keyboard 19. The radius circuit 22 transforms the rounding radius R into rounding arc parameters including the center of curvature of the arc and the entering and leaving points of the arc. These parameters are sent into the computer 16 for point-by-point computation of the rounding arc RK. The radius circuit 22 is activated by a rounding signal $S_R$ which is supplied through operation of a rounding key 23 in the keyboard 20. The rounding radius R is transmitted from the input units 18 into the memory 17 where it is temporarily stored. The radius circuit 22 is preferably a microcomputer of high operating speed programmed to produce the rounding arc parameters.

Computer 16 is further capable of providing straight line interpolation as well as tool radius compensation. Straight line interpolation is the provision of desired positions along a straight line by the computer 16. Tool radius compensation is where for a given contour K the computer calculates a compensated contour K'. The compensated contour K' is delivered through control 8 to the directional control loops for the X and Y directions and to the control loop for the Z direction which is not represented in FIG. 2. Thus, the center point M of the tool 7 moves along the compensated contour K' equidistant to the prescribed contour K.

Figure 3:
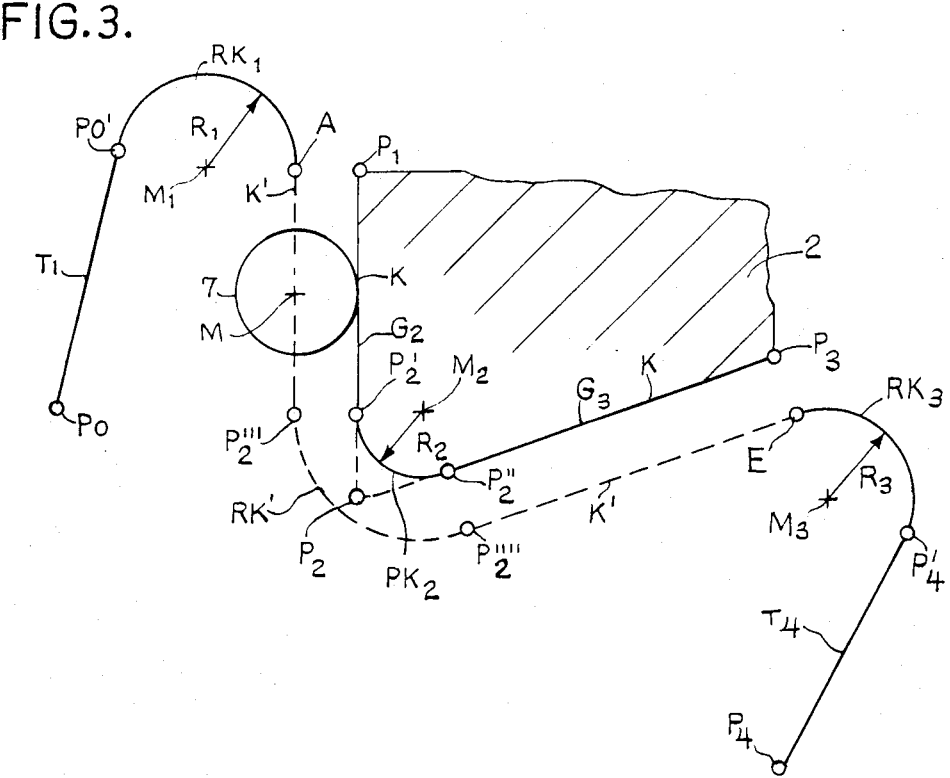
FIG. 3 shows a workpiece contour and the compensated contour path of the machine tool according to the invention.

The operation of the invention can be explained more fully by referring to FIG. 3. A prescribed contour K composed of two intersecting straight lines $G_2$ and $G_3$ is to be milled in a workpiece 2. The intersection point $P_2$ of the two lines is to be rounded off with a rounding arc $RK_2$ having a rounding radius $R_2$. At the start of the operation the center M of the tool 7 is at a prescribed point $P_0(X_0, Y_0)$. An instruction which reads as follows is input on the input unit 18, "straight line to point $P_1$ $(X_1, Y_1)$ with tool radius correction beginning at point $P_1$, rounding with rounding radius $R_1$ and straight line to point $P_2(X_2, Y_2)$". The radius circuit 22 calculates the starting point $P_0'(X_0', Y_0')$ and the end point A $(X_A, Y_A)$ as well as the center $M_1$ of the rounding arc $RK_1$. These parameters are supplied to the computer 16 for arc interpolation of the rounding arc $RK_1$.

Figure 4:
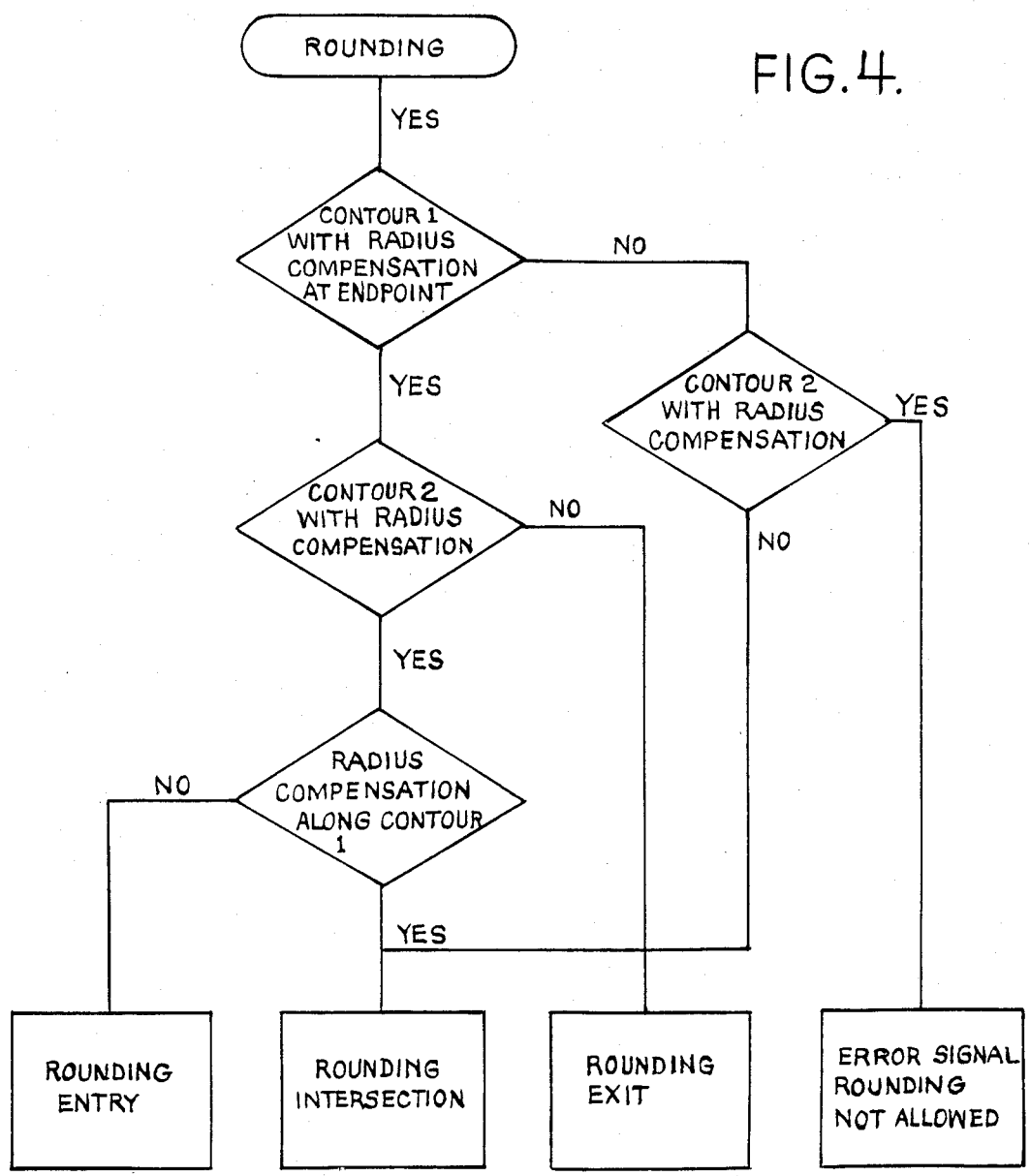
FIG. 4 is a flow diagram of the program performed by the radius circuit.
Figure 4B:
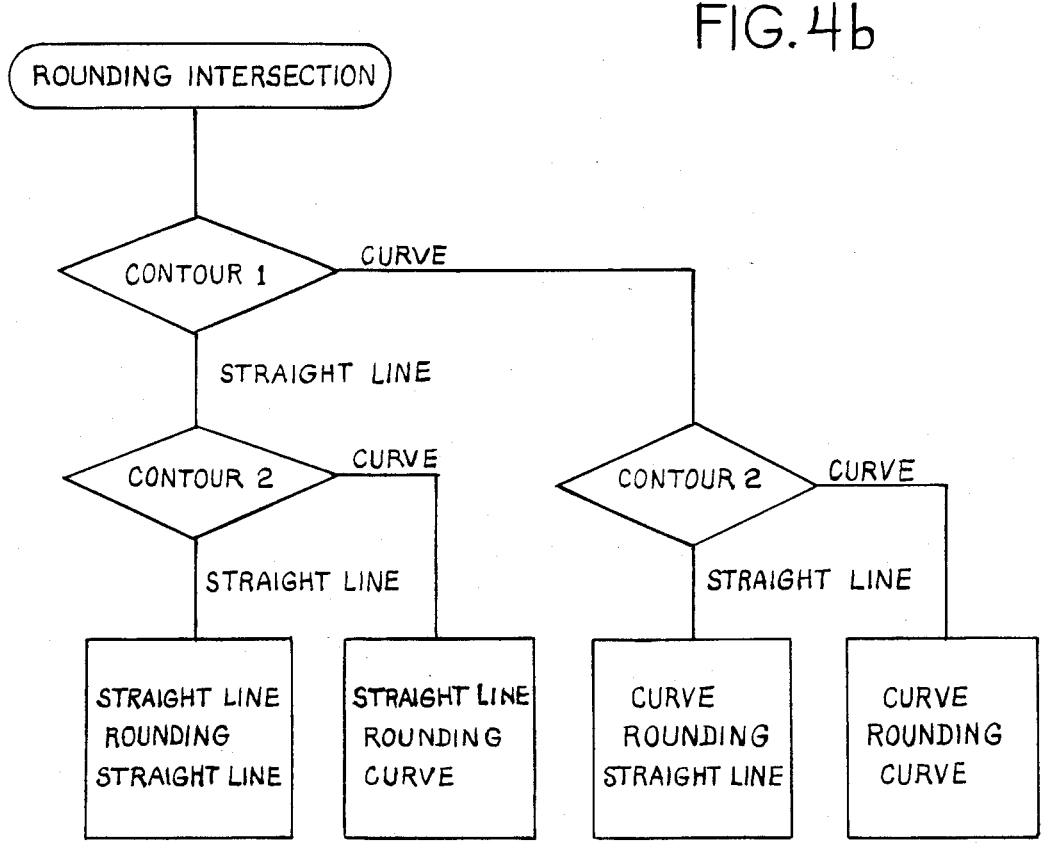

The operation of the radius circuit 22 is best understood in conjunction with the flow charts in FIGS. 4a–c. When the rounding key 23 is depressed the radius circuit 22 begins its analysis and calculation as in FIG. 4. The circuit looks to see whether radius compensation is needed on the first contour and/or the second contour. As seen in the diagram, the radius circuit can then easily determine whether the rounding arc will be used to enter into a contour to be machined, to exit from a contour that was machined or as a transition between two contours. For the instruction just described in the previous paragraph, the radius circuit 22 will be calculating the parameters for a rounding arc which will be used for entering into a contour 2 to be machined. Therefore, it will perform the rounding entry subroutine described in the flow chart of FIGS. $4a_1$ and $4a_2$. The radius circuit 22 first determines the direction of the contour 2 to be entered. Then it calculates the position of the end point A of the rounding arc by compensating for the tool radius in relation to the starting point $P_1$ of the contour 2. The straight line between the initial point $P_0$ and the end point A makes an angle with the starting direction of the contour 2. This angle is looked at to determine on which side of contour 2 the midpoint M should be placed. Since tangential entry is desired the midpoint M is placed on a line perpendicular to the starting direction of contour 2 and at the distance of the rounding radius R from the end point $P_A$. The starting point of the arc $P_0'$ is calculated from the triangle $P_0MP_0'$. The angle of this triangle at point $P_0'$ is 90° since tangential entry into the arc is desired. It is also known that the length of the side $P_0'M$ is equal to the rounding radius and that the length of the line between $P_0$ and M can be easily determined as those two points have been fixed. Thus, $P_0'$ can be geometrically determined. Having determined the end points of the rounding arc the straight line $P_0-P_0'$ and the circular arc $P_0'-P_A$ are ready to be interpolated.

Continuing with the machining operation in FIG. 3 the next instruction is, "straight line to point $P_2(X_2, Y_2)$ with continued tool radius compensation, rounding with rounding radius $R_2$ and straight line to point $P_3$ $(X_3, Y_3)$". The radius circuit 22 then calculates the starting point $P_2'(X_2', Y_2')$ and the end point $P_2''(X_2'', Y_2'')$ of the prescribed contour, as well as with consideration of the tool radius compensation, corresponding points $P_2'''$ $(X_2''', Y_2''')$ and $P_2''''(X_2'''', Y_2'''')$. These points are supplied to the computer 16 for arc interpolation of the correct compensated rounding arc RK'.

These points for the intersection of two contours is determined by the radius circuit 22 by its performance of the rounding intersection subroutine shown in FIG. 4b. The rounding intersection subroutine has subroutines of its own for each possible combination of intersections between straight lines and circles. For the desired contour shown in FIG. 3 the radius circuit 22 will perform the subroutine for straight line-rounding-straight line found in FIGS. $4b(1_1)$ and $4b(1_2)$.

The final instruction to complete the operation shown in FIG. 3 is "straight line to point $P_3(X_3, Y_3)$ with tool radius compensation, rounding with rounding radius $R_3$ and straight line to point $P_4(X_4, Y_4)$ without tool radius compensation". The radius circuit 22 calculates the starting point E $(X_E, Y_E)$ and the end point $P_4'$ $(X_4', Y_4')$ as well as the center $M_3$ of the rounding arc $RK_3$ by performing the rounding exit subroutine shown in FIGS. $4c_1$ and $4c_2$. These parameters are then supplied to the computer 16 for arc interpolation of the rounding arc $RK_3$.

The center M of the tool 7 can be moved from the initial point $P_0$ to the point $P_4$ at a constant speed, since the rounding arc $RK_1$, RK' and $RK_3$ are tangential to their adjoining straight lines $T_1$, K' and $T_4$. The prescribed contour K may be composed of any arrangement of straight lines and/or circular arcs. If subsequent rounding arcs are to have the same rounding radius then the value of the radius may be conveniently stored in the memory 17.

Of course, it should be understood that various changes and modifications to the preferred embodiment described above will be apparent to those skilled in the art. Changes may be made without departing from the spirit and the scope of the invention and without diminishing its attendant advantages. It is therefore intended that such changes and modifications be covered by the following claims.

We claim:

1. An improved numerically controlled machine tool for controlling movement of a tool along a workpiece contour with compensation for tool radius, which includes an electronic control including: an input unit; a memory; a computer provided with means for arc interpolation and straight line interpolation; and a drive arrangement, responsive to the electronic control, for movement of the tool; wherein the improvement comprises:

means for supplying first and second radii which define curvatures of arcs to be made by the tool before the tool comes into contact with the workpiece contour and after the tool leaves contact with the contour;

means for supplying a rounding signal;

means, responsive to the rounding signal, for transforming the first and second rounding radii into parameters required by the means for arc interpolation for pointwise calculation of respective entry and exit rounding arcs from the parameters, said entry rounding arc intersecting a starting point of the workpiece contour tangentially and passing via a first tangent to a first prescribed point, said exit rounding arc intersecting an end point of the workpiece contour tangentially and passing via a second tangent to a second prescribed point.

2. The machine tool of claim 1 wherein both the first and second rounding radii are freely selectable, independently of the radius of the tool.

3. The machine tool of claim 1 wherein at least one of the rounding radii differs from the radius of the tool.

4. The machine tool of claim 1 wherein the first and second prescribed points are spaced from the workpiece contour such that the tool is out of contact with the workpiece contour.

5. An improved numerically controlled machine tool for controlling movement of a tool along a workpiece contour which includes an electronic control including: an input; a memory; a computer provided with means for arc interpolation and straight line interpolation; and a drive arrangement, responsive to the electronic control, for movement of the tool; wherein the improvement comprises:
   rounding means for controlling the tool to round corners of a workpiece between a pair of intersecting workpiece contour segments;
   means for supplying a freely selectable rounding radius, independent of a radius of the tool, to the rounding means;
   means for supplying a rounding signal to the rounding means;
   means, included in the rounding means and responsive to the rounding signal, for transforming the rounding radius into parameters required by the means for arc interpolation for pointwise calculation of a rounding arc from the parameters, said rounding arc intersecting both of the workpiece contour segments tangentially.

6. The machine tool of claim 1 or 5 wherein said transforming means is a microcomputer.

7. The machine tool of claim 5 further comprising means for compensating for the tool radius so that a desired contour is machined as the tool follows a compensated contour.

8. The machine tool of claim 5 further comprising means for storing the rounding radius, so that the rounding radius may be reused without inputting the rounding radius again.

9. The machine tool of claim 5 wherein the rounding radius differs from the radius of the tool.

* * * * *

UNITED STATES PATENT AND TRADEMARK OFFICE
CERTIFICATE OF CORRECTION

PATENT NO. : 4,503,493
DATED : March 5, 1985
INVENTOR(S) : Horst Burkhardt, Josef Huber and Norbert Vollmayr It is certified that error appears in the above-identified patent and that said Letters Patent is hereby corrected as shown below:

IN THE BRIEF DESCRIPTION
OF THE DRAWINGS

In column 2, line 1, please delete "$5c_2$" and substitute therefore --$4c_2$--;

Signed and Sealed this

Nineteenth Day of August 1986

[SEAL]

Attest:

DONALD J. QUIGG

Attesting Officer

Commissioner of Patents and Trademarks